Patented May 25, 1948

2,441,945

UNITED STATES PATENT OFFICE 2,441,945

COPOLYMER COMPOSITIONS CONTAINING FINELY DIVIDED METAL PARTICLES

Per K. Frolich, Westfield, and Irving E. Lightbown, Roselle, N. J., assignors, by mesne assignments, to Jasco, Incorporated, a corporation of Louisiana No Drawing. Application August 24, 1940, Serial No. 354,098

4 Claims. (Cl. 152—330)

This invention relates to synthetic rubber-like polymers, relates particularly to compositions of matter utilizing the advantageous properties of plastic, elastic, synthetic polymers, and relates especially to compositions of matter composed of mixtures of interpolymers of an isoolefin such as isobutylene and a diolefin such as butadiene, in intimate admixture with metal powders and active metal compounds for use in plastic, elastic materials.

Rubber for long has been the preferred plastic, elastic structural material for many uses, but rubber is chemically highly unsaturated, and is subject to many reactions, and is particularly subject to injury and loss of strength from contact with certain metals, alloys, and metal salts such as copper, brass, bronze, nickel and various of the other common structural metals and their salts and compounds which substances, particularly in the powdered form, or in the form of the various compounds, exert a powerful catalytic effect on the rubber in any form, to cause a deepseated disintegration of the rubber molecule which appears to be in part an oxidation reaction and in part a molecular weight breakdown.

It has now been found possible to produce by a low temperature polymerization procedure a very valuable plastic, elastic polymer which, while not a synthetic rubber, has many of the advantageous physical properties of rubber, while avoiding many of its chemical and physical disadvantages. This synthetic polymer is produced by the polymerization of an isoolefin such as isobutylene, with a diolefin such as butadiene, isoprene, pentadiene, dimethylbutadiene, or the like. The polymerization reaction is conducted at temperatures ranging from about $-10°$ C. or $-40°$ C. to $-100°$ C. or lower and consists in the mixing of the liquefied olefins with a liquefied diluent refrigerant such as liquid ethylene, or with a refrigerant such as solid carbon dioxide with or without a higher boiling diluent. To the rapidly stirred mixture there was then added, preferably by spraying onto the surface, a catalyst consisting of aluminum chloride or similar metal halide dissolved in a suitable solvent such as carbon disulfide or the low freezing alkyl halides. The resulting polymer has a molecular weight ranging from 15,000 to 150,000 or above, has an iodine number ranging between 1 and 40, preferably between 2 and 9, depending upon the quantity of diolefin interpolymerized into the polymer; and in addition the polymer has the capability of reacting with sulfur, in spite of its very low iodine number, to develop an elastic limit in the material, a tensile strength ranging from 2500 pounds to 4500 pounds per square inch, an ultimate elongation ranging from 900 to 1200%, and a high abrasion and flexure resistance. The resulting material while not a synthetic rubber in any way, is a high grade substitute for rubber, possessing many advantages over rubber.

There are many instances where a plastic, elastic material is desired which at the same time is at least a semi-conductor for electricity such as for rubber belting, tires for gasoline tank trucks, X-ray shields and similar uses. To the present it has not been possible to produce such structures without a serious or fatal loss of other necessary properties, since rubber which has previously been the only satisfactory plastic, elastic substance cannot satisfactorily be compounded with heavy metals or heavy metal salts in pulverized form because of the powerful catalytic destructive effect of the metals upon the rubber. This is particularly true with copper and metals of groups VII and VIII of the periodic table, which exert a very powerful and rapidly destructive effect upon rubber.

It is found, however, that the interpolymer of isobutylene and a diolefin, especially after curing with sulfur or a sulfo-genetic compound such as tetramethyl thiuram disulfide or analogous compounds, retains its strength, elasticity and physical properties in the presence of copper, copper salts and other similar metals and metal salts.

Accordingly, the present invention provides a compound consisting of an interpolymer of an isoolefin and a diolefin together with pulverized metal or metal powder or metal salts, especially the heavy metals and heavy metal salts such as copper, iron, lead, zinc, cadmium, aluminum, tin, antimony, cobalt, nickel, manganese, bismuth, and if desired the noble metals or rare metals including gold, silver, platinum, iridium, osmium, and in addition tungsten, molybdenum, chromium, tantalum and various powdered non-ferrous alloys, such as bronze and brass, as well as various mixtures of salts of these metals. When compounded with lead or uranium or even mercury or their salts, the composition is particularly advantageous for shields for radiation work, the lead and mercury either as metals or as metal compounds being powerfully absorbent for X-ray and radium radiations. Likewise, uranium is powerfully absorbent in spite of its secondary radiation, and a number of interesting phenomena are obtainable by finely dispersing uranium or uranium salts in the interpolymer compound. When compounded with copper, nickel, iron and similar metals in powdered or pulverized form, the electrical resistance of the metal is markedly reduced if the particles are sufficient in quantity to lie in near contact with each other within the body of the polymer. Alternately, if the quantity of metal particles is less, and especially if they are present in finely divided form, the material will serve as a very high grade insulator in which the metal particles serve to control the distribution of the electrostatic field within the insulating body by a condenser effect. The electrostatic condenser control of the electrostatic charge in the insulator may be enhanced by the preparation of alternate layers of polymer, such layers being one substantially free from metal and the next containing a relatively large quantity of metal such as to cause it to become a semi-conductor.

Thus an object of the invention is to compound an olefinic and diolefinic interpolymer material with metal particles or metal salts, while retaining the durability, elasticity, tensile strength, and advantageous physical properties of the interpolymer, both before and after curing with sulfur. Other objects and details of the invention will be apparent from the following description.

In practicing the invention the raw material is an interpolymer of an isoolefin and diolefin which may be prepared by a typical low temperature polymerization procedure consisting of the mixing of from 70 to 99 parts of an isoolefin such as isobutylene with from 30 to 1 parts of a diolefin such as the above-mentioned butadiene, isoprene, pentadiene, or dimethylbutadiene or similar diolefins together with from 100 to 350 parts of liquid ethylene to produce a mixture of olefins at a temperature of approximately $-98°$ C. Onto the surface of the rapidly stirred mixture, there is then sprayed a polymerization catalyst which preferably consists of aluminum chloride dissolved in an alkyl halide such as methyl chloride or in carbon disulfide or other similar low freezing inert solvent for the metal halide. The polymerization reaction proceeds rapidly to yield the desired polymer having a molecular weight ranging from 15,000 to 150,000 or above. When the reaction has proceeded to the stage of polymerization of from one-half to four-fifths of the mixed isoolefin and diolefin, the catalyst is quenched by the addition of a substance such as an alcohol, ketone, ammonia, or other oxygenated or alkaline substance. The solid polymer is then removed, brought up to room temperature, washed to remove the catalyst decomposition products and dried. This polymer is the desired interpolymer.

The polymer is then compounded with the desired ingredients which may consist of approximately 100 parts of the polymer, together with from one-half to ten parts of sulfur, from one to five parts of stearic acid, from one to five parts of zinc oxide, approximately one part of tetramethyl thiuram disulfide, or a similar thiuram or dithiocarbamate compound and the desired proportion of the metal substance which may range from one to two hundred parts or more according to the desired characteristics. More than a single metal may be used, and other fillers may be used including carbon black, whiting, barytes, lithopone, etc.

*Example 1*

The composition of the invention is particularly advantageous for power transmission belting and for conveyor belting, especially in cases where combustible substances are present and particularly where inflammable or explosive dusts occur since the semi-conducting character of the belt prevents the accumulation of static charges and avoids the possibility of ignition of combustible or explosive material by electric sparks from the belt.

For this purpose a compound according to the subjoined formula may be used:

| | Parts |
|---|---|
| Isobutylene-butadiene polymer | 100 |
| Sulfur | 3 |
| Stearic acid | 5 |
| Zinc oxide | 5 |
| Copper powder | 10 |
| Tuads (tetramethyl thiuram disulfide) | 1 |

In preparing this compound the polymer may be placed upon a double roll mill of the type commonly used for rubber, worked until warmed up, and various solids except the Tuads added to it and worked in by cutting the material across the roll and overlapping from alternate sides until a thoroughly homogeneous compound is obtained. The compound is then desirably cooled, and the Tuads added as rapidly as possible to the relatively cool compound and worked in reasonably thoroughly but quickly, and the material fully cooled to avoid a premature cure. This compound may then be calendered on to a square woven fabric in the manner analogous to that used for the making of rubber belting, and successive layers of fabric with layers of compound between layers of fabric, and layers of compound on opposite sides and edges to give adequate protection to the fabric may be prepared in a manner closely analogous to that used for the making of rubber belting. The assembled structure is then cured at a temperature of approximately 155° C. for a period of time ranging from 15 to 60 minutes, depending upon the amount of Tuads present, the thickness of the material and other factors. The resulting belt has a high durability, high tensile strength, a high flexure and abrasion resistance and is a markedly superior power transmission belt and a markedly superior conveyor belt since, because of its semi-conducting character, no amount of friction or inductive effect will develop an electrostatic charge, and accordingly sparks cannot occur during the use of the belt since all electrostatic charges are carried away through the metal pulley and the grounded bearings.

The comparative stability of the new compound of the present invention in contrast to rubber is well shown by the following test.

A composition of the iso-olefin-diolefin polymer was prepared as shown in the above formula of Example 1 and approximately 1% of copper oleate was mixed into the composition in place of the copper powder above recommended, since copper oleate is a strongly active metal salt. Simultaneously, a rubber composition was prepared containing sulfur, stearic acid, zinc oxide and an accelerator to produce a "pure gum" composition closely analogous to that of the above in Example 1 and into the rubber composition there was also mixed approximately 1% of copper oleate. The two compositions were then cured under pressure in a mold in a normal manner and test samples cut from both of the cured compositions. These test samples were then artificially aged in a Geer oven. After relatively few hours, approximately 5 hours, the rubber sample had lost all of its tensile strength and had disintegrated into a pasty mass which had dropped from the rack to the bottom of the oven. The iso-olefin-diolefin polymer composition containing the 1% of copper oleate was held in the test oven for a period of seven days and then tested for tensile strength and no reduction in tensile strength was found to have occurred, indicating that this polymer is substantially wholly inert with respect to copper oleate; in sharp contrast to rubber, which is very quickly disintegrated by copper oleate.

*Example 2*

A similar compound is highly advantageous for automotive tires where it is desired that no opportunity shall be allowed for the development of electrostatic charges on the vehicle. For this purpose a compound similar to that in Example 1 may be used.

| | Parts |
|---|---|
| Isobutylene-butadiene polymer | 100 |
| Sulfur | 3 |
| Stearic acid | 5 |
| Zinc oxide | 5 |
| Copper powder | 10–15 |
| Tuads (tetramethyl thiuram disulfide) | 1 |
| Carbon black | 75 |

This compound may be applied to square woven fabric or cord fabric, either cotton or rayon, or to metal wire structures in a manner analogous to the building and assembling of rubber tires. The various layers of fabric may be prepared by calendering the compound into the fabric in the manner customary in preparing fabric for rubber tires and suitable layers of compound may be added to the surface of the calendered cords. The fabric is then assembled in the manner analogous to that used for rubber tires and a suitable layer of compound for the tread is applied to the outer surface. The carcass is then cured in a suitable mold at a temperature of approximately 155° C. for a time ranging from 15 to 90 minutes, according to the size of the carcass and the temperature. A tire made of this compound shows the high durability, high tensile strength and high elasticity characteristic of the interpolymer material; shows the high flexure resistance and high abrasion resistance likewise characteristic of the material when compounded and cured, and in addition shows a relatively high electrical conductivity, sufficient to prevent the development of electrostatic charges upon the body of a vehicle carried upon such tires. This is particularly valuable when hydrocarbon fuels are unloaded through a hose from such a truck, since the electrostatic charge which may be developed by the flow of the hydrocarbon liquid through the hose is dispersed and carried to earth through the semi-conducting tire carcasses.

*Example 3*

A compound of this type is particularly advantageous for use as X-ray shields for which purpose lead powder or a lead compound may be substituted for the copper powder suggested in Examples 1 and 2. A suitable formula for this purpose is as follows:

| | Parts |
|---|---|
| Iobutylene-butadiene polymer | 100 |
| Sulfur | 3 |
| Stearic acid | 5 |
| Zinc oxide | 5 |
| Lead powder | 300 |
| Tuads (tetramethyl thiuram disulfide) | 1 |

Alternatively, lead compounds such as white lead (basic lead carbonate) may be used according to the following formula:

| | Parts |
|---|---|
| Isobutylene-butadiene polymer | 100 |
| Sulfur | 3 |
| Stearic acid | 5 |
| Zinc oxide | 5 |
| White lead | 300 |
| Tuads (tetramethyl thiuram disulfide) | 1 |

Either of these formulae are compounded in a manner similar to that outlined in Example 1, and the compound may be sheeted out on the mill in sheets of suitable thickness and cured in a similar manner. The sheets may then be cut to shape for protective garments or the uncured sheets may be lapped around suitable forms or in molds, and cured to produce gloves or similar articles of clothing.

X-ray shield structures are not limited to lead or the included metal, but may be constructed incorporating colloidal mercury, or mercury oxide, or other mercury compounds, or bismuth may be used in spite of its lower absorption coefficient, or even uranium may be used in spite of its own inherent radiation.

*Example 4*

The material is particularly advantageous for the production of insulator structures of the type of corona reducing structures, or condenser bushings or other analogous structures in which there are provided alternate layers of insulating and conducting materials with the conducting layers serving as condenser plates to distribute the electrostatic stresses. For this purpose two compounds are desirably prepared, one containing conducting metal powder in large quantity, and the other free from metal powder. Depending upon the physical requirements of the insulator, the material may contain a more or less stiffening filler such as clay or other non-conducting solid. Thus the insulating layer may be produced from a compound as subjoined:

| | Parts |
|---|---|
| Isobutylene diolefin polymer | 100 |
| Stearic acid | 5 |
| Zinc oxide | 5 |
| Clay | 50 to 200 |
| Tuads (tetramethyl thiuram disulfide) | 1 |
| Sulfur | 2 |

For the second or conducting layer, the formula may consist of:

| | Parts |
|---|---|
| Isobutylene diolefin polymer | 100 |
| Flake copper powder | 20–25 |
| Zinc oxide | 5 |
| Stearic acid | 5 |
| Tuads (tetramethyl thiuram) | 1 |
| Sulfur | 3 |

These compounds are desirably prepared on the mill in the manner similar to that described in Example 1, and are desirably sheeted out on the mill into sheets of appropriate thickness which may for the insulating compound range from 0.050 inch to 0.500 inch and the semi-conducting layer may desirably be sheeted out into thicknesses ranging from 0.020 inch to 0.150 inch. Alternate layers of the conducting and non-conducting compounds are then laid up into the desired structure such as an insulating sleeve around a conductor and are cured in an appropriate mold. Under these conditions the conducting layer becomes the conducting plate of a condenser to produce the desired condenser type of insulator or insulating bushing. For transformer bushings, it is usually advantageous to have the bushing fairly stiff, and accordingly relatively large amounts of the clay filler and the metal powder filler may be incorporated, in some instances amounts even in excess of those above indicated. In other instances such for example as high tension cables in which a considerable flexibility or elasticity is desired, lesser amounts of the metal powder and insulating filler may be used to retain a larger proportion of the original elasticity and flexibility of the cured polymer. Exact proportions cannot be given, in view of the variation in requirements which occurs with change in size of the conductor and change in character of support, whether drawn through ducts or supported on insulators in the open air, or carried under water. The structure is particularly advantageous for high tension submarine cables, because of the exceedingly high resistance of the material to water and the uniform distribution of electrostatic stresses obtained by the presence of the conducting layers.

This compound as prepared with lead is particularly advantageous for stereotypers blankets where the combined weight and plasticity of the material permit of the very advantageous preparation of stereotype matrices. The material is advantageous for vacuum tube grid leaks for which purpose the conductivity is very readily controlled. In fact, the material is of particular advantage wherever a heavy, very soft, plastic material is required or for any uses where penetrating radiation is to be intercepted or for any uses where a semi-conducting, plastic, elastic substance is needed.

Thus the composition of the invention consists of a mixture of an iso-olefin-diolefin polymer, preferably a polymer of isobutylene with butadiene or isoprene, or dimethylbutadiene or pentadiene, admixed with sulfur, a curing aid, and an active metal powder or salt, especially those of the I (group B), VII and VIII groups of the periodic table and the heavy metals in general.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A composition of matter comprising in combination a synthetic, solid, plastic, hydrocarbon interpolymer of a major proportion of isobutylene with a minor proportion of a diolefin having 4 to 6 inclusive carbon atoms per molecule, characterized by a low unsaturation below an iodine number of 40, a molecular weight above 15,000 and reactivity with sulfur to yield a product of increased elasticity together with copper powder.

2. A composition of matter comprising in combination a cured, synthetic, solid, elastic, hydrocarbon polymer of a major proportion of isobutylene with a minor proportion of a diolefin having 4 to 6 inclusive carbon atoms per molecule, said cured elastic polymer having an elastic limit and a tensile strength at break above 1,000 pounds per square inch and having chemically combined sulfur therein, together with copper powder.

3. An article of manufacture comprising a fabric and an impregnating and covering synthetic, solid, plastic, hydrocarbon polymer of a major proportion of isobutylene with a minor proportion of a diolefin having 4 to 6 inclusive carbon atoms per molecule, characterized by a low unsaturation below an iodine number of 40, a molecular weight above 15,000 and reactivity with sulfur to yield a product of increased elasticity, together with pulverized copper.

4. An automobile tire comprising a fabric and an impregnating and covering synthetic, solid, plastic, hydrocarbon polymer of a major proportion of isobutylene with a minor proportion of a diolefin having 4 to 6 inclusive carbon atoms per molecule, characterized by a low unsaturation below an iodine number of 40, a molecular weight above 15,000 and reactivity with sulfur to yield a product of increased elasticity, together with pulverized copper.

PER K. FROLICH.
IRVING E. LIGHTBOWN.

REFERENCES CITED

The following references are of record in the file of this patent:

UNITED STATES PATENTS

| Number | Name | Date |
|---|---|---|
| 1,950,662 | Dreyfus | Mar. 13, 1934 |
| 2,078,353 | Thomas | Apr. 27, 1937 |
| 2,084,784 | Stahl | June 22, 1937 |
| 2,160,204 | Gibbons | May 30, 1939 |
| 2,162,178 | Marasco | June 13, 1939 |
| 2,196,579 | Reinhardt | Apr. 9, 1940 |
| 2,197,127 | Eger | Apr. 16, 1940 |

FOREIGN PATENTS

| Number | Country | Date |
|---|---|---|
| 513,521 | Great Britain | Oct. 16, 1939 |

OTHER REFERENCES

Thomson, Manchester Lit. and Phil. Soc., vol. 4, pp. 266–281 (1892).